United States Patent [19]

Ferree et al.

[11] 4,381,852
[45] May 3, 1983

[54] AUTOMATIC TENSIONING CONTROL FOR WINDING STATOR COILS

[75] Inventors: Herbert E. Ferree, Hempfield Township, Westmoreland County; Dirk J. Boomgaard, Monroeville, both of Pa.

[73] Assignee: Westinghouse Electric Corp., Pittsburgh, Pa.

[21] Appl. No.: 375,605

[22] Filed: May 6, 1982

Related U.S. Application Data

[63] Continuation of Ser. No. 198,495, Oct. 20, 1980, abandoned, which is a continuation of Ser. No. 6,834, Jan. 26, 1979, abandoned.

[51] Int. Cl.³ .................... H02K 15/04; H01F 41/04; B65H 81/00
[52] U.S. Cl. ................... 242/7.13; 140/92.2; 242/45; 242/157.1
[58] Field of Search .................. 242/7.13, 25, 45, 53, 242/54, 75.42, 75.43, 75.44, 75.51, 75.52; 140/92.2

[56] References Cited

U.S. PATENT DOCUMENTS

| 3,128,521 | 4/1964 | Baker | 242/45 |
| 3,289,959 | 12/1966 | Scher | 242/45 |
| 3,497,154 | 2/1970 | Lasarev et al. | 242/75.44 |
| 3,936,008 | 2/1976 | Crum | 242/75.44 |
| 3,991,949 | 11/1976 | Ureshino | 242/4 BE |

Primary Examiner—Billy S. Taylor
Attorney, Agent, or Firm—L. P. Johns

[57] ABSTRACT

An automatic tensioning control for winding stator coils characterized by a looper for winding lengths of wire into loops for stator coils, a reel of wire for paying off wire to the looper under controlled conditions, and tension sensing means between the reel and looper for measuring the tension on the wire and for providing an indicating signal for applying a restraining torque on the reel.

5 Claims, 9 Drawing Figures

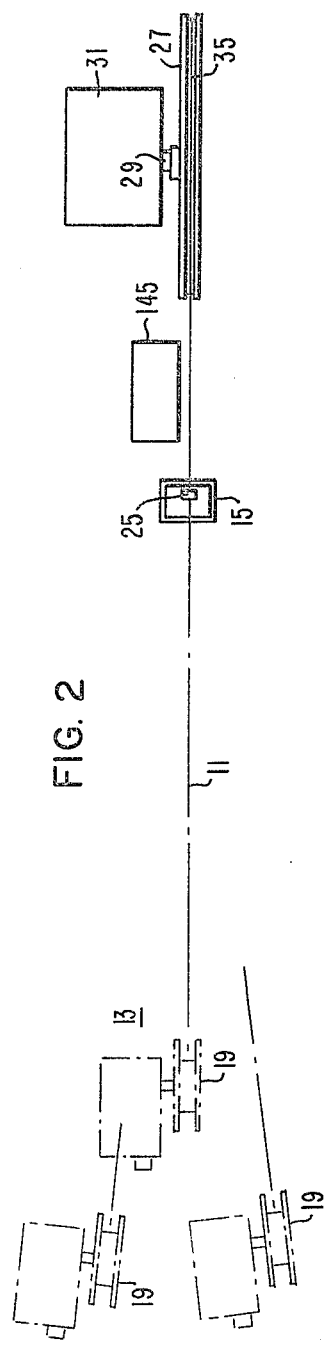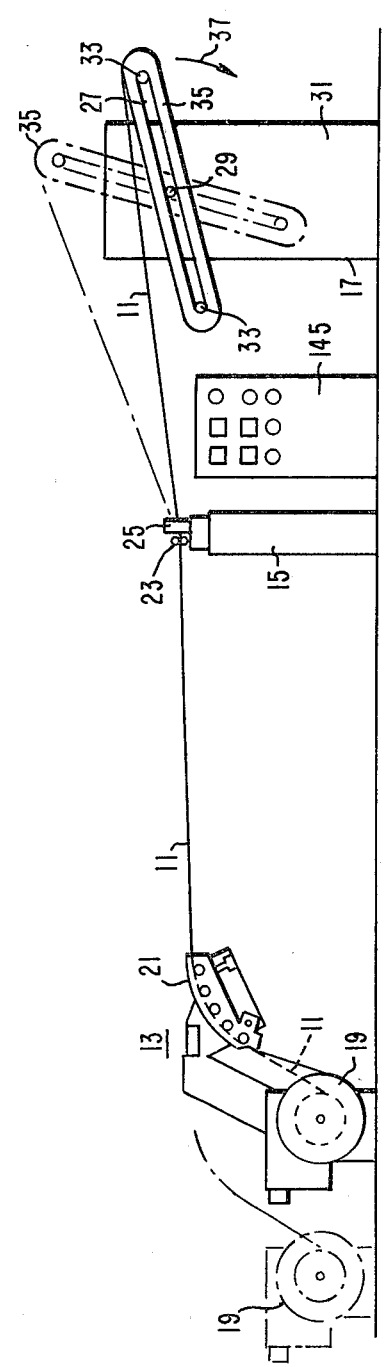
FIG. 2
FIG. 1

AUTOMATIC TENSIONING CONTROL FOR WINDING STATOR COILS

This is a continuation of application Ser. No. 198,495, filed Oct. 20, 1980, now abandoned, which was a continuation of Ser. No. 6,834, filed Jan. 26, 1979, now abandoned.

BACKGROUND OF THE INVENTION

1. Field of the Invention:

This invention relates to an automatic tensioning control system for winding stator coils.

2. Description of the Prior Art:

In winding loops for stator coils the wire is usually wound around two pins with permanently formed 180° bends around each pin in ideally straight wire sides between the bends. The force necessary to achieve these bends is provided by the tension force of the wire. Heretofore the tension force has been achieved in several ways, still in use, including the crudest methods, such as a spring-loaded rope around the grooved rim of steel acting as a brake to restrain rotation of the reel on a central shaft. Simple spring-loaded pressure plates gripping the wire and tensioning by means of sliding friction on the insulated wire is still used. A more advanced device uses an air cylinder with spring adjustment to apply pressure to drum brakes to restrain the rotation of the reel on a central shaft.

All known production systems for stator coils depend upon operator skill in judging when the tension is adequate to bend the wire around the pin, and the operator usually adjusts some kind of spring-loaded friction device to obtain a suitable tension. No calibration of friction force versus adjustment is provided because the friction force varies widely and even if the braking force were constant on the reel, the wire tension would increase by about 60%, as the wire is unwound from about 22-inch diameter down to 14-inch diameter on the reel. While the wire can withstand large variations in tension without sustaining serious damage, such variations in tension will alter the shape of the loop and excess tension makes insulation damage more probable.

Further, operators frequently spend a large amount of time, and waste copper in trying to get the tensions adjusted in several wires at once and often loop coils with two or three wires very tight and one or two wires nearly too loose for an acceptable loop with four wires (for example) in parallel. The operator can only judge wire tightness by pulling on the wires and the braking force usually changes as the brakes become heated due to friction.

SUMMARY OF THE INVENTION

It has been found in accordance with this invention that the disadvantages inherent in prior known systems for winding loops of stator coils may be avoided by providing a device for winding loops for stator coils which comprises a looper means for winding lengths of wire into loops for stator coils; dereeler means for unreeling a length of wire to the looper means and for automatically controlling tension on the wire; tension sensing means between the dereeler means and the looper means for measuring the tension on the wire and for providing an indicating signal; means for receiving the signal and comparing it with a predetermined tension load setting and transmitting a resulting voltage to tension means in the dereeler means in response to any opposite torque in the dereeler means.

The advantage of the dereeling system of this invention is that it provides a machine for holding a reel of wire weighing about 400 pounds and applying tensioning torque using a combination magnetic-powder clutch-brake system to maintain a tension that is automatically controlled at a set value. The machine unreels wire with less insulation damage and without sharp bends, and tension is accurately controlled for more uniform loops leading to better stator coils.

BRIEF DESCRIPTION OF THE DRAWINGS

FIG. 1 is an elevational view of the layout of the dereeler and looper in accordance with this invention;

FIG. 2 is a plan view of the layout of FIG. 1;

DESCRIPTION OF THE PREFERRED EMBODIMENT

Figure 3:
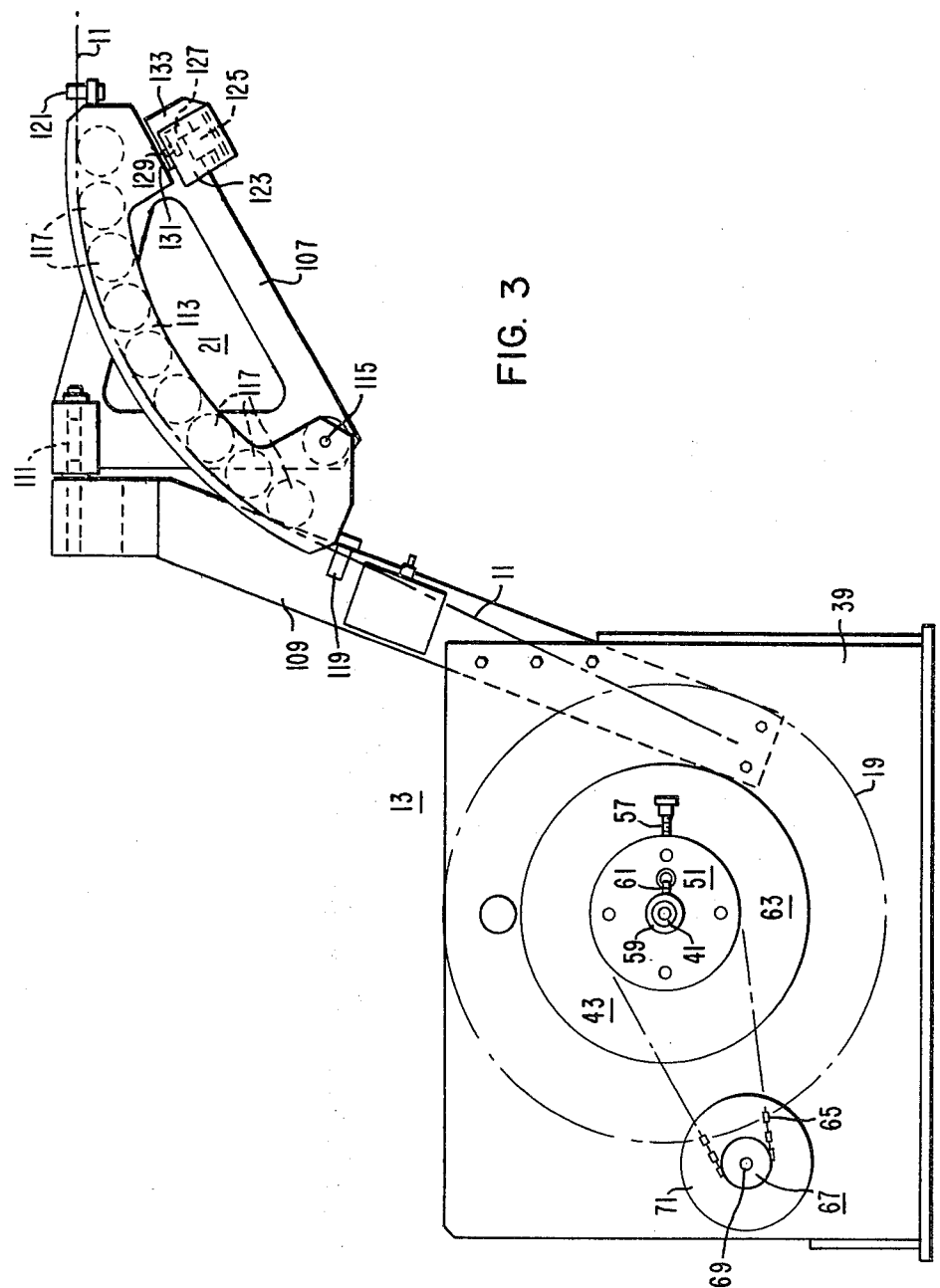
FIG. 3 is an elevational view of the dereeler.

In FIG. 1 at least one strand of wire 11 extends from a dereeler generally indicated at 13, through a wire guide 15 to a looper 17. One or more dereelers 13 are provided. Each dereeler 13 comprises a wire reel 19 and a tension sensing structure 21. The wire guide 15 comprises a pair of horizontal guide rolls 23 and a pair of vertical guide rolls 25 through which the wire 11 passes on its way to the looper 17. The looper 17 comprises a winding bar or lever 27 which is mounted on a driven shaft centrally located at 29. The shaft 29 is driven by a motor within a housing 31.

More particularly, the winding bar or lever 27 is an elongated member having similar pins 33, one at each end thereof on which the wire 11 is wound to form a stator coil 35 when the winder 27 is rotated clockwise as indicated by the arrow 37. Operation of the device of this invention is generally described as follows: The reel 19 of wire 11 rotates to unreel the wire which travels over the sensor structure 21 which measures the wire tension and provides an indicating signal to an electronic logic circuit, which determines the control current applied to a clutch/brake assembly which applies a restraining torque to a sprocket and chain which is attached to the hub and shaft supporting the reel and thus controls the wire tension. The wire 10 in turn moves from the tension structure 21 through the wire guide 15 to the winder 27 where a pulling force is applied to the wire by the motor driven shaft 29.

Figure 4:
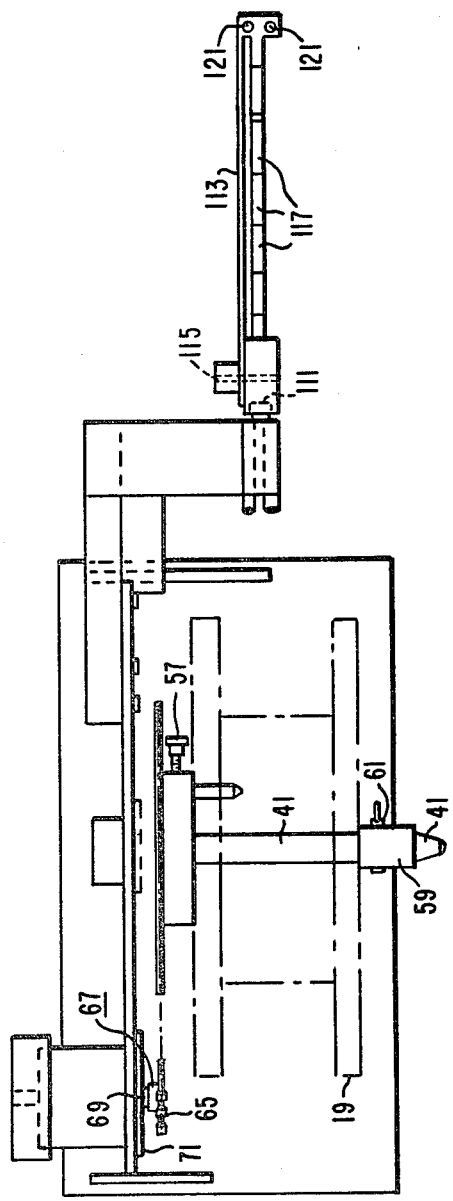
FIG. 4 is a plan view of the dereeler.
Figure 6:
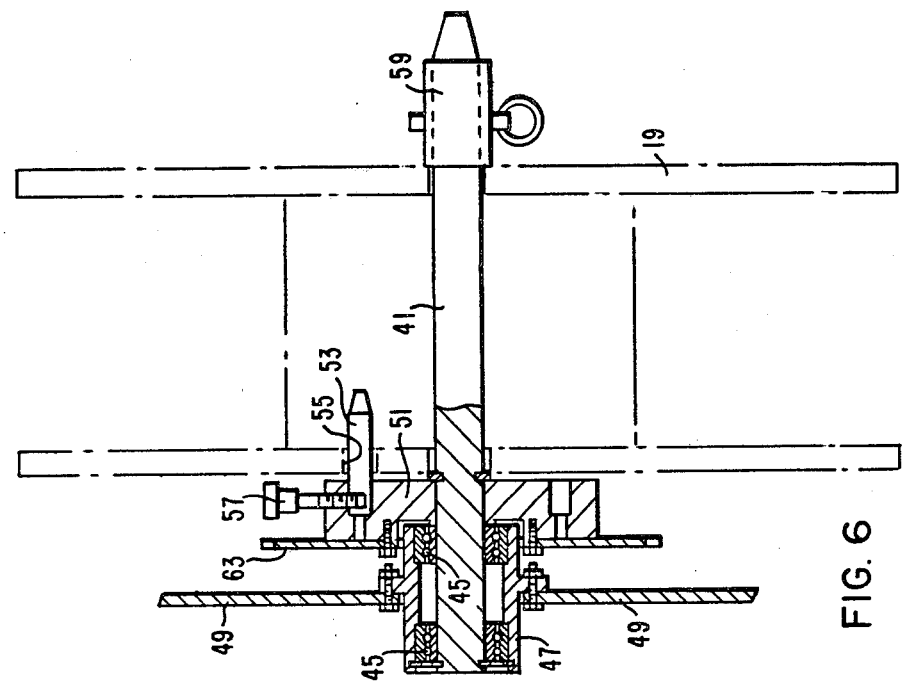
FIG. 6 is a horizontal view partially in section of the spindle for the wire reel.
Figure 5:
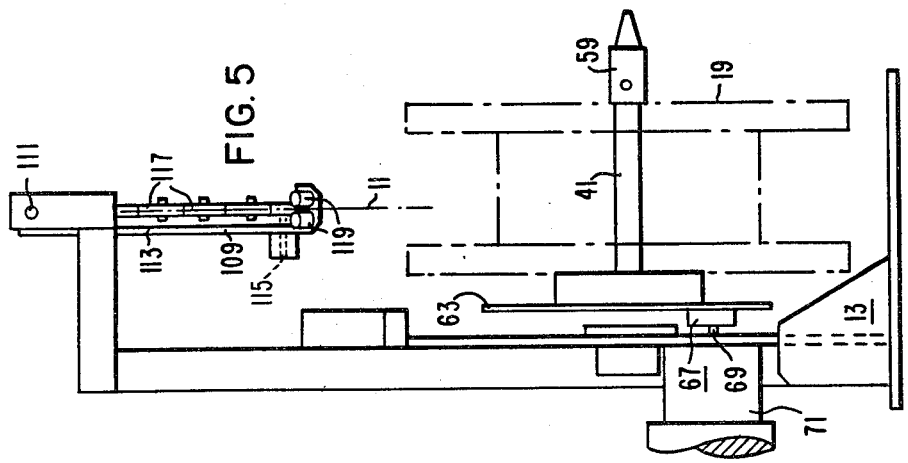
FIG. 5 is an end view of the dereeler.

As shown more particularly in FIGS. 3, 4, and 5 the dereeler 13 comprises a mounting frame 39, a spindle 41, torque control means 43, and the tension structure 21. The spindle 41 (FIG. 6) is mounted on low friction ball bearings 45 within a bearing housing 47 which in turn is mounted on the frame 39. A plate 51 mounted on the spindle 41, has a pin 53 which extends through a hole 55 at one side of the reel 15. A set screw 57 secures the pin 53 in place. A retaining ring 59 for holding the reel 15 in place includes a detent pin 61 for holding the ring on the end of the spindle 41. Finally, a sprocket 63 is mounted on the plate 51.

Figure 7:
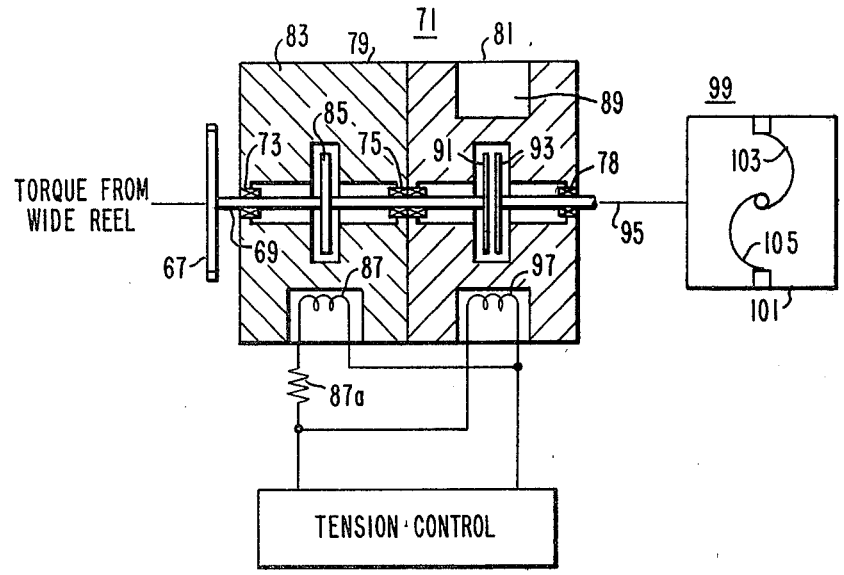
FIG. 7 is a schematic sectional view of the brake clutch and buffer spring for controlling tension on the wire reel.

A drive chain 65 (FIG. 3) extends between the sprocket 63 and a sprocket 67 which is mounted on a drive shaft 69 of a clutch-brake structure 71. The shaft 69 (FIG. 7) is mounted in spaced bearings 73, 75, 77 within a housing of a brake 79 and clutch 81. The brake 79 comprises a U-shaped core 83 of electromagnetic material, a ferromagnetic disc 85, and a coil 87 for energizing the core 83. The clutch 81 comprises a core 89 and a pair of spaced ferromagnetic discs 91, 93, the former of which is mounted on the end of the shaft 69 and the latter of which is mounted on a shaft 95 supported by bearing 78. A coil 97 functions with the core 89. In addition, a buffer spring structure 99 is provided at the right end of the shaft 95 (FIG. 7) and comprises a housing 101 for containing a spiral assembly which includes four coil springs, such as 103, 105, the other ends of which are secured to the housing 101 and the inner ends of which are attached to the surface of the shaft so that when the shaft 95 rotates, the springs wrap around the shaft.

The tension structure 21 (FIG. 3) comprises a frame 107 which is pivotally mounted on a support arm 109 by a pivot pin 111. The frame 107 supports a lever 113 which is pivotally mounted on the frame by pivot pin 115 and the lever is disposed in the plane of travel of the wire 11. A plurality, and preferably nine, pulleys 117 are supported on the lever to guide the wire 11 between the dereeler 13 and the looper 17. At the lower end of the lever 113 a pair of guide rolls 119 (FIG. 5) guide the wire 11 as it enters the zone of the pulleys. Another pair of guide rolls 121 are similarly provided at the upper end of the lever 117 to guide the wire 11 as it exits from the pulleys 117.

Figure 8:
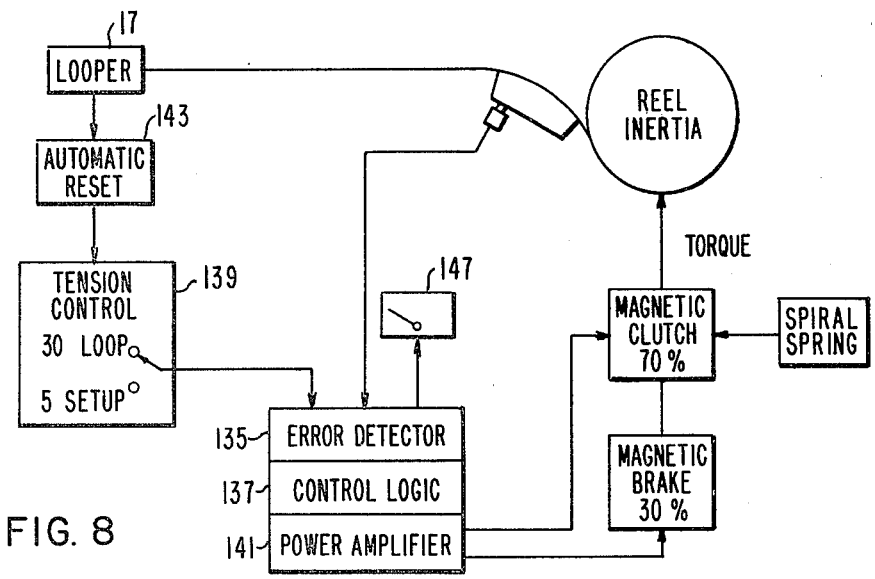
FIG. 8 is a schematic view showing the interrelation between the reel, the tension sensor, the looper, and the tensioning means.

At a spaced distance from the pivot pin 115 tension-sensing means 123 are provided on the frame 107 which comprise a load cell 125 including a strain gage 127. The load cell 125 also has a contact anvil 129 which engages a contact point 131 on the lever 113. A stop bar 133 on the frame 107 limits clockwise movement of the lever 113. As the looper 17 draws wire 11 over the tension structure 21, a clockwise force is applied to the lever 113 of varying magnitude, depending upon the tension of the wire. Variations of tension are detected by the strain gage 127 on the load cell 125 which together provide an electrical indication of the wire tension. Such indication is an electrical signal which is converted to a tension force reading on a standard millivoltmeter and is used in an error detector 135 of a logic circuit 137 (FIG. 8) to detect variations from a preset tension value on a tension control 139. The tension control 139 enables an operator to set the tension required on the wire as it moves from the dereeler to the looper.

The control logic circuit 137 then determines the control current necessary for a power amplifier 141 to properly control the wire tension to the set value. However, the speed of response is controlled to a medium rate to avoid a tendency toward tension oscillations. Also, the control current is proportioned between the clutch 81 and the brake 79 of the tensioning device. The clutch 81 provides most (about 70%) of the tensioning torque while the brake 79 absorbs energy from oscillations in tensions thereby rapidly damping any oscillations.

The brake 79 acts in response to the buffer spring structure 99 which enables the shaft 95 to rotate during damping action. To complete the system the start and stop signals from the looper 17 cause an automatic reset device 143 to establish the tension at a lower reset value when the looper is stopped and automatically resets the tension to the higher set value when looping starts. The lower tension enables the operator to pull the wire manually to reload the looper machine 17. Also, when the looper 17 starts drawing the wire, the higher tensioning torque is added gradually to the decreasing tension force needed to overcome the inertia of the heavy reel 19. This greatly decreases the surge in the wire tension when the looping resumes, and it therefore lessens the starting load on the looping device as well as decreasing wire damage.

The clutch/brake device is a commercially available item sold by Simplatrol Products Div. of Dana Corporation, and is an electromagnetic device operating with dry magnetic powder as the friction medium with magnetizing coils to control the coupling and braking torques. The torque load from the dereeling wire actuates the brake shaft 69 and the buffer spring 99 is mounted on the clutch end of the clutch brake assembly. The springs 103, 105 are attached to the shaft 95 and limit the rotation of the clutch shaft in response to the torque load which is applied on the shaft to wind the springs in a manner similar to clock springs. The control current to the magnetizing coils 87, 97, is proportioned to give a braking torque equal to about half of the torque which would cause the clutch to slip. Thus, the brake portion resists the shaft rotation in either direction and provides very effective oscillation damping, while at the same time providing about one-third of the controlled tensioning torque.

The clutch portion couples the shafts 69, 95 together to wind up the springs 103, 105 until the spring torque is equal to the slipping torque of the clutch at which point the clutch slips and starts functioning as a tensioning brake, providing about two-thirds of the controlled torque. When the looper 17 stops pulling the wire 11 the springs 103, 105 provide limited rewinding because the clutch holding torque is about twice the brake torque and the springs thus reverse rotation of the shaft 95 until the spring torque equals the brake torque. About 50% more tensioning torque is thereby available than would be available from either the clutch or the brake alone. Thus, with the clutch/brake rated at 10 feet pound torque for normal use, in this application with a 6:1 ratio multiplier provided by the chain 65 and sprockets 63, 67, the torque available at the dereeling shaft 41 is 90 ft.-lb. plus any transmission friction torque.

The tension measuring structure 21 provides the linkage mechanism for applying the tension indicating force to the load cell 125, includes a mechanical overload protection device for the load cell, and at the same time provides reverse bending of the wire on the large radius of the several pulleys 117 which in this case is preferable to straighten the wire. The force indicating linkage is provided of lightweight components which exert minimum lateral forces on the wire 11 and follow the wire position on the reel 15 by rotating about the axis of the pivot pin 111. The frame 107 supports the sheaves or pulleys 117 on the pivot pin 115 to maintain alignment of the lever 113 so that a force is applied on the load cell 125 as the lever 113 rotates about its pivot point.

Reverse bending of the wire 11 reduces the tendency of the loops of the coil 35 to bulge in the straight portion when lower wire tension is used, and reverse bending eliminates most non-uniformity due to the wire bending around a varying axis as it is wound on the reel. Reverse bending on what is effectively a large radius of about 22 inches is accomplished in the minimum space by using the series of nine pulleys 117 spaced closely together with centers on a radius of about 21 inches. If the pulleys 117 were spaced further apart with small cross-section wire at high tension, the wire 11 would be bent plastically as it moves over each pulley and straightened again as it passed between the pulleys which would cold work the copper and make it undesirably hard and springy. To avoid this the size and spacing of the pulleys have been determined by calculation for the normal range of wire sizes and annealed yield strength to assure that plastic deformation does not occur due to the pulleys except for the reverse bending on an effective radius of 22 inches. Simply stated, there is effectively one plastic bend around the radius of 22 inches, rather than a series of small bends around each pulley.

The wire reel 19 is mounted on the spindle 41 and is secured by the pin 53 to the large drive sprocket 63. The assembly of the bearings 45 enables the use of a reel 19 weighing up to 500 pounds with wire tensions up to 100 pounds. The constant low rolling friction of the bearing assembly enables more constant tension control than could be accomplished with journal bearings at low speed.

Early tests of the dereeler revealed that serious tension oscillations and wire jerking could occur even with open loop control where the tension was read on a meter and control current was manually adjusted by an operator. The oscillations appeared to come from several variable interactive sources including the reel inertia, start and stop motion of looping, and wire whip or oscillation between the dereeler and the looper. Limited rewind and oscillation damping is important but oscillations still occur with automatic closed loop control if the response speed is not adjusted to the correct rate. A medium speed of response is used which assures that the braking current is not overcorrected due to the jerk of the starting inertia and yet it will still reach an adequate value for proper tension before the first turn is completed around a knuckle pin.

When the looper 17 is stopped, it is desirable to reset the tension control to a low value. This setup tension allows an operator to draw the wire 11 more easily to set up the next loop and avoids adding a high braking tension to the tension caused by the inertia of a heavy reel of wire resisting rapid acceleration when looping is started at high speed. However, when looping stops it is preferred that the tension is not reset too quickly before the reel can stop and rewind if overtravel occurs. The greater braking torque is needed to stop the reel even though the tension drops to zero and rewinding will not work unless the clutch is adequately engaged. Therefore, the automatic tension reset is delayed for a fraction of a second. The automatic reset action is initiated by signals from the switching which operates the drive motor for the looper 17.

Figure 9:
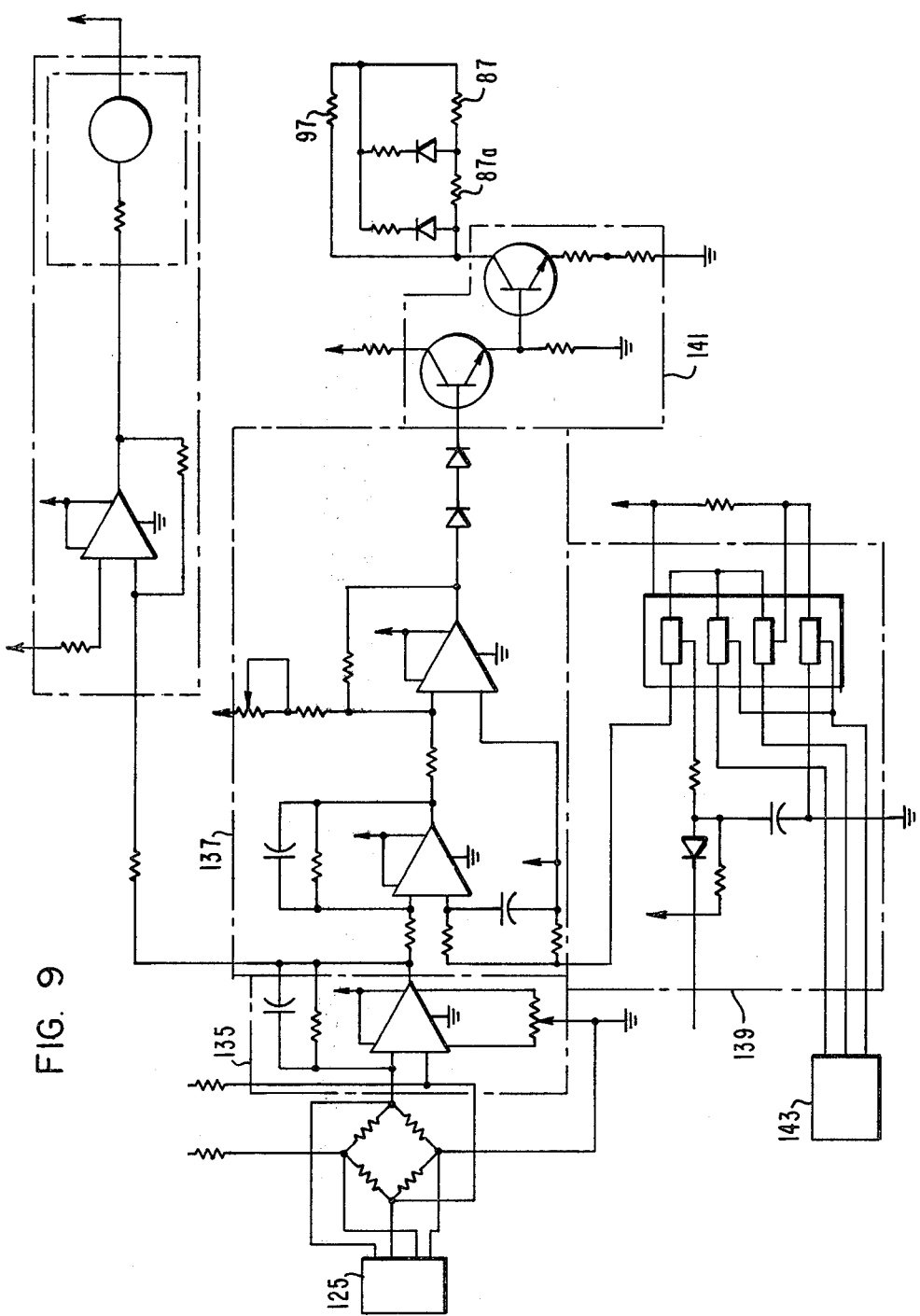
FIG. 9 is a circuit diagram.

A control cabinet 145 is provided as shown in FIG. 1 and a circuit diagram of the several parts described above is shown in FIG. 9. A signal from the load cell 125 is received by the error detector 135 for amplification and filtering. The looper 17 actuates the automatic reset 143 to close the switch when a looper is running, thereby, selecting the loop tension in the tension control 139 which is in turn transmitted to the error detector 135. The resulting signal from the load cell 125 and the tension control 139 is sent to the control logic 137 where the error between the desired tension and the actual tension is determined and sent to the power amplifier 141. The amplified error signal goes to the automatic clutch 81 and the brake 79. A dial 147 in the control cabinet 145 indicates to an operator the actual wire tension. Where the desired tension at the tension control 139 is greater than the actual tension, the output current is increased at the amplifier 141 to the clutch and brake structure 71 to adjust the torque on the spindle 41. However, when the desired tension is less than the actual tension, the output current is reduced to the clutch brake structure 71 in order to adjust the wire tension to the desired value.

What is claimed is:

1. A device for winding loops for stator coils comprising:
   looper means for winding lengths of wire into loops of stator coil;
   dereeler means including a wire-storage reel for unreeling a length of wire to the looper means;
   tension-sensing means between the dereeler means and the looper means for measuring tension on the wire and for providing a voltage signal;
   the tension-sensing means comprising a pivotally-mounted lever on which a plurality of longitudinally and closely spaced wire-supporting pulleys are mounted, the pulleys being disposed on centers in an arcuate path having a radius on the side of the wire opposite the radius of the reel to effect reverse bending of a wire as it moves from the reel to the looper means along a plane of travel;
   tension-control means connected to the dereeler means and responsive to the tension-sensing means for controlling tension on the wire;
   means for receiving the voltage signal comparing it with a voltage for a predetermined tension load and transmitting a resulting voltage signal to the tension-control means;
   a lever-support frame mounted adjacent to the path of travel of the wire and being pivotally mounted on an axis that is in said plane of travel; and
   the lever being pivotally mounted on the frame and on an axis that is substantially normal to said plane of travel.

2. The device of claim 1 in which the tension sensing means comprises a load cell for sensing tension on the wire.

3. The device of claim 2 in which the means for receiving a signal comprises control logic means for determining the resulting voltage signal upon a comparison with the predetermined voltage.

4. The device of claim 3 in which the dereeler means comprises, a magnetic clutch, and a magnetic brake which respond to said resulting voltage.

5. The device of claim 4 in which the magnetic clutch and magnetic brake provide about 70% and 30%, respectively, of the tension torque on the dereeler means.

* * * * *